(12) United States Patent
Rathore et al.

(10) Patent No.: US 12,346,810 B2
(45) Date of Patent: Jul. 1, 2025

(54) METHOD AND SYSTEM FOR SELF SUPERVISED TRAINING OF DEEP LEARNING BASED TIME SERIES MODELS

(71) Applicant: Tata Consultancy Services Limited, Mumbai (IN)

(72) Inventors: Pradeep Rathore, Pune (IN); Arghya Basak, Pune (IN); Sri Harsha Nistala, Pune (IN); Venkataramana Runkana, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 863 days.

(21) Appl. No.: 17/555,554

(22) Filed: Dec. 20, 2021

(65) Prior Publication Data

US 2023/0033835 A1 Feb. 2, 2023

(30) Foreign Application Priority Data

Jul. 2, 2021 (IN) .............................. 202121029887

(51) Int. Cl.
*G06N 3/08* (2023.01)
*G06F 18/214* (2023.01)
*G06F 18/2433* (2023.01)

(52) U.S. Cl.
CPC ............ *G06N 3/08* (2013.01); *G06F 18/2148* (2023.01); *G06F 18/2155* (2023.01); *G06F 18/2433* (2023.01)

(58) Field of Classification Search
CPC ... G06N 3/08; G06F 18/2148; G06F 18/2155; G06F 18/2433

(Continued)

(56) References Cited

U.S. PATENT DOCUMENTS 9,699,049 B2  7/2017  Gupta et al.
10,236,167 B1 *  3/2019  Noda .................. H01J 49/0036
(Continued)

FOREIGN PATENT DOCUMENTS

CN  111651983 A  9/2020
KR  10-2017-0083419  7/2017

OTHER PUBLICATIONS

The Electrical Engineering Handbook, 2005, pp. 813-837, Chapter 1 by Ansari et al (Year: 2005).*

(Continued)

*Primary Examiner* — Austin Hicks
(74) *Attorney, Agent, or Firm* — Finnegan, Henderson, Farabow, Garrett & Dunner, LLP

(57) ABSTRACT

This disclosure relates to method and system for training of deep learning based time-series models based on self-supervised learning. The problem of missing data is taken care of by introducing missing-ness masks. The deep learning model for univariate and multivariate time series data is trained with the distorted input data using the self-supervised learning to reconstruct the masked input data. Herein, the one or more distortion techniques include quantization, insertion, deletion, and combination of the one or more such distortion techniques with random subsequence shuffling. Different distortion techniques in the form of reconstruction of masked input data are provided to solve. The deep learning model performs these different distortion techniques, which force the deep learning model to learn better features. It is to be noted that the system uses a lot of unlabeled data available cheaply as compared to the label or annotated data which is very hard to get.

7 Claims, 8 Drawing Sheets

(58) Field of Classification Search
USPC .......................................................... 706/25
See application file for complete search history.

(56) References Cited

U.S. PATENT DOCUMENTS

| | | | |
|---|---|---|---|
| 2020/0100256 A1* | 3/2020 | Shasha | H04B 7/0695 |
| 2020/0387797 A1* | 12/2020 | Ryan | G06N 3/084 |
| 2021/0019611 A1 | 1/2021 | Kothuvatiparambil | |
| 2021/0319341 A1* | 10/2021 | Han | G06N 3/044 |
| 2022/0138090 A1* | 5/2022 | Zhong | G06F 11/0793 |
| | | | 714/38.1 |
| 2022/0200731 A1* | 6/2022 | Sudo | H04L 1/0045 |

OTHER PUBLICATIONS

Jawed et al., "Self-supervised Learning for Semi-supervised Time Series Classification," (2020).

\* cited by examiner

METHOD AND SYSTEM FOR SELF SUPERVISED TRAINING OF DEEP LEARNING BASED TIME SERIES MODELS

CROSS-REFERENCE TO RELATED APPLICATIONS AND PRIORITY

This U.S. patent application claims priority under 35 U.S.C. § 119 to India Application No. 202121029887, filed on Jul. 2, 2021. The entire content of the abovementioned application is incorporated herein by reference.

TECHNICAL FIELD

The disclosure herein generally relates to the field of training of deep learning models and specifically, to a method and system for self-supervised training of a deep-learning based model with time-series data

BACKGROUND

Deep learning based models have become a part of our life. These models are present in smart watches (for predicting abnormal heart disease), mobile phones, manufacturing industries (for predictive maintenance), self-driven cars etc. The training of deep learning based models is a very complex task and requires huge amount of labelled data. Getting labelled data in industries is very limited and difficult because it requires expensive manual labelling by experts.

Large amount of labelled data is either very limited in industries or very expensive to acquire because labelling or annotation of unlabeled data require lot of human expertise and manual labor. In real-time system, many times there is lot of missing data due to sensor fault, communication fault or some unavoidable reasons but there is no suitable approach to utilize time series data containing lot of missing values without imputation for tasks such as classification, regression and anomaly detection.

SUMMARY

Embodiments of the disclosure present technological improvements as solutions to one or more of the above-mentioned technical problems recognized by the inventors in conventional systems. For example, in one embodiment, a system and method for self-supervised training of a deep learning based model with un-labelled time-series data is provided.

In one aspect, a processor-implemented method for self-supervised training of a deep learning based model with un-labelled time-series data is provided. The method includes one or more steps such as receiving a plurality of input data from one or more predefined data sources, wherein the plurality of input data is un-labelled time-series data, and pre-processing the received plurality of input data to remove noise and outliers from the received plurality of input data and to achieve uniform sampling frequency of the received plurality of input data.

The processor-implemented method includes masking the preprocessed plurality of input data for one or more missing values of the input data, distorting the masked plurality of input data using one or more distortion techniques, and training the deep learning based model with the distorted plurality of input data using the self-supervised learning to reconstruct the masked plurality of input of data. Herein, the one or more distortion techniques include quantization, insertion, deletion, and combination of the one or more distortion techniques with random subsequence shuffling.

In another aspect, a system for self-supervised training of a deep learning based model using un-labelled time-series data is provided. The system includes an input/output interface configured to receive a plurality of input data from one or more predefined data sources, at least one memory storing a plurality of instructions and one or more hardware processors communicatively coupled with the at least one memory, wherein the one or more hardware processors are configured to execute the plurality of instructions stored in the at least one memory. Herein, the plurality of input data is un-labelled time-series data and the time-series data includes univariate and multi-variate datasets. Further, the system is configured to pre-process the received plurality of input data to remove noise and one or more outliers from the received plurality of input data and achieve uniform sampling frequency of the time-series data. Further, the system is configured to mask the preprocessed plurality of input data for one or more missing values of the input data and distort the masked plurality of input data using one or more distortion techniques. Herein one or more distortion techniques include quantization, insertion, deletion, and combination of the one or more distortion techniques with random subsequence shuffling. And, finally, the system is configured to train the deep learning based model with the distorted plurality of input data using the self-supervised learning to reconstruct the masked plurality of input data.

In yet another aspect, there are provided one or more non-transitory machine-readable information storage mediums comprising one or more instructions, which when executed by one or more hardware processors causes a method for self-supervised training of a deep learning based model with un-labelled time-series data is provided. The method includes one or more steps such as receiving a plurality of input data from one or more predefined data sources, wherein the plurality of input data is un-labelled time-series data, and pre-processing the received plurality of input data to remove noise and outliers from the received plurality of input data and to achieve uniform sampling frequency of the received plurality of input data.

The processor-implemented method includes masking the preprocessed plurality of input data for one or more missing values of the input data, distorting the masked plurality of input data using one or more distortion techniques, and training the deep learning based model with the distorted plurality of input data using the self-supervised learning to reconstruct the masked plurality of input data. Herein, the one or more distortion techniques include quantization, insertion, deletion, and combination of the one or more distortion techniques with random subsequence shuffling.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
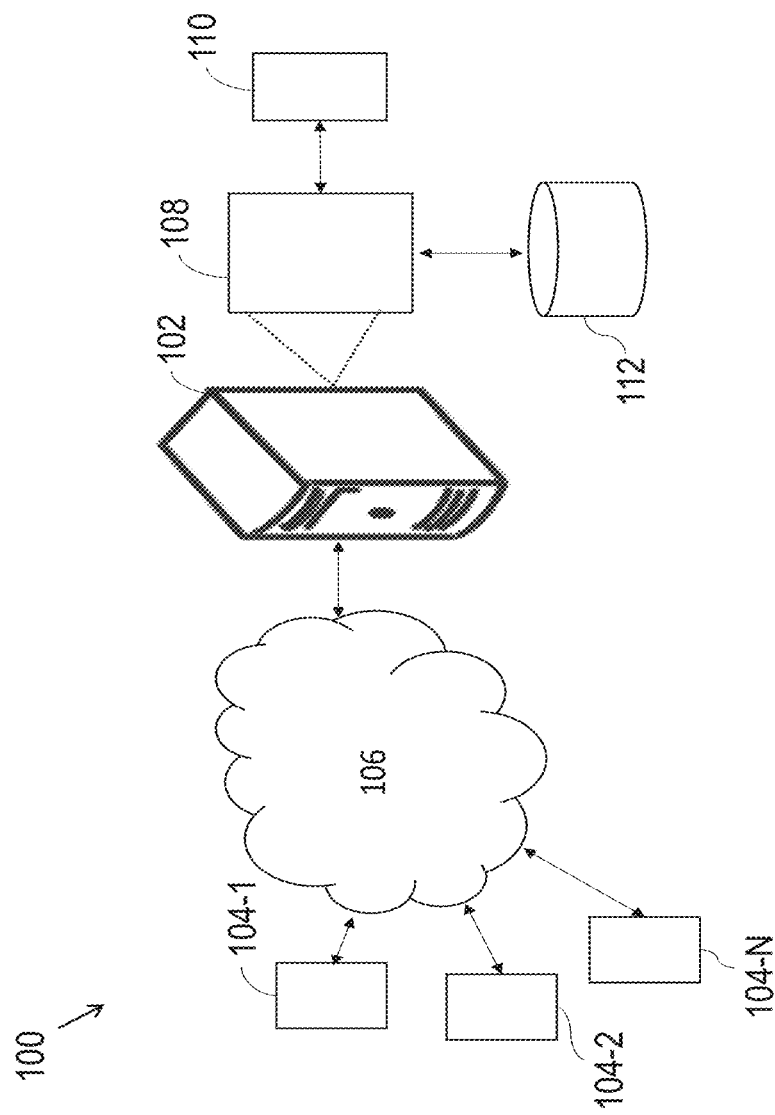
FIG. 1 illustrates an exemplary system for training of time-series deep learning based models based on self-supervised learning, according to an embodiment of the present disclosure.

It is to be understood that both the foregoing general description and the following detailed description are exemplary and explanatory only and are not restrictive of the invention, as claimed.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and system for training a deep learning based model with a time-series data.

Referring now to the drawings, and more particularly to FIG. 1 through 8, where similar reference characters denote corresponding features consistently throughout the figures, there are shown preferred embodiments and these embodiments are described in the context of the following exemplary system and/or method.

FIG. 1 illustrates a block diagram of a system (100) for training of time-series deep learning based models based on self-supervised learning, in accordance with an example embodiment. Although the present disclosure is explained considering that the system (100) is implemented on a server, it may be understood that the system (100) may comprises one or more computing devices (102), such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. The components and functionalities of the system (100) are described further in detail.

Figure 2:
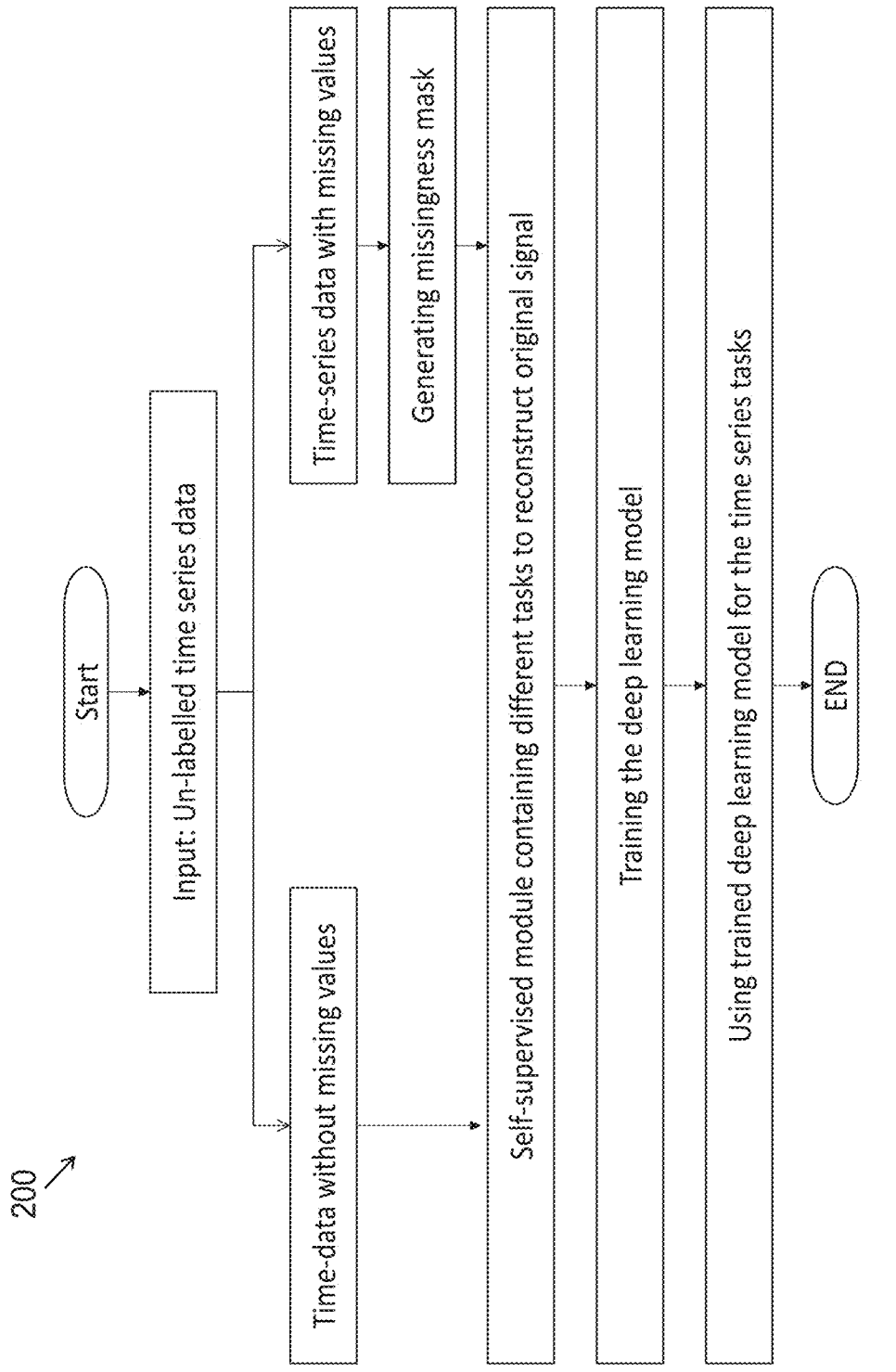
FIG. 2 illustrates a functional flow diagram for training of time-series deep learning based models based on self-supervised learning, according to an embodiment of the present disclosure

Referring FIG. 2, illustrating a functional flow diagram to illustrate the system for training of time-series deep learning based models based on self-supervised learning. It would be appreciated that large amount of labelled data is either very limited in industries or very expensive to acquire because labelling or annotation of unlabeled data require lot of expertise and manual labor. Further, in real systems, many times there is a lot of missing data due to one or more sensors' fault, communication fault or some unavoidable reasons but there is no guideline to utilize time series data containing lot of missing values without imputation for distortion techniques such as classification, regression and anomaly detection.

In one embodiment, a concept of insertion, deletion, quantization, and masking of time series is introduced for self-supervised learning. Firstly, missingness mask is generated corresponding to missing values present in the data. The missingness mask is univariate and multivariate for univariate and multivariate data respectively. It is to be noted that herein the deep learning based models are trained to learn in a self-supervised way to predict the masked signal. Different distortion techniques for the deep learning based model are provided to solve using a masked time-series data. The deep learning based model performs these different distortion techniques, which force the deep learning based model to learn better features of the time-series data. One such task is insertion and deletion of timestamps in time-series data. The system is configured to reconstruct the original masked signal for the entire time window. The system ignores those timestamps which have missing data originally while calculating loss. It is to be noted that the system uses a lot of un-labeled time-series data available cheaply as compared to the label or annotated time-series data which is very hard to get. The system is configured to handle missing data appropriately without need of imputation because of using appropriate missingness mask In another embodiment, wherein the system (100) is configured for training of time-series deep learning based models based on self-supervised learning. The system (100) comprises at least one memory with a plurality of instructions, one or more databases (112), one or more input/output interfaces (104) and one or more hardware processors (108) which are communicatively coupled with the at least one memory to execute a plurality of modules (110) therein. Further, the system comprises a pre-processing module, a masking module, a data distortion module, and a training module. Herein, the input/output interface (106) is configured to receive a plurality of input data from one or more predefined data sources. Herein, the plurality of input data includes univariate and multi-variate datasets which is un-labelled time-series data.

In the preferred embodiment, the pre-processing module of the system (100) is configured to perform pre-processing of the received plurality of input data from one or more sensors. Pre-processing involves outlier identification and removal of redundant data, filtering of data, and unification of sampling frequency of the time-series data.

In the preferred embodiment, the masking module of the system (100) is configured to mask the preprocessed plurality of input data for one or more missing values of the input data. It is to be noted that the one or more missing values are present in the input univariate or multivariate data, therefore the system is configured to apply missingness mask corresponding to the one or more missing values.

Let $X \in R^{MXN}$ be the input data to the deep learning based model where M are the number of samples or instance and N are the number of features to the deep learning based model. The system introduces mask, $A \in [0,1]$ of dimension MXN where 0 represent the missing value of the sensor and 1 represent the presence of the sensor value.

In the preferred embodiment, the data distortion module of the system (100) is configured to distort the masked plurality of input data using one or more distortion techniques. The one or more distortion techniques include quantization, insertion, deletion, and combination of the one or more distortion techniques with random subsequence shuffling. It is to be noted that the one or more distortion techniques are known as distortion techniques for the deep learning based model. These distortion techniques include reconstruction of original signal from the distorted plurality of input data. Herein, each of the one or more distortion techniques comprise of few randomly chosen samples from the original masked data along with different types of distortion for the same set of samples. Kindly note that we provide randomly chosen masked input data along with the distorted version of these samples in the same minibatch while training deep learning based models.

In another embodiment, wherein $T^1, T^2, T^3 \ldots T^n$ are the distortion techniques to be performed by the deep learning based model and $x \in X$ is the subset of unlabeled input data.

Let $x^1, x^2, x^3 \ldots x^n$ be the input samples in a minibatch. The self-supervised training calculates $x_T^1, x_T^2, x_T^3, \ldots, x_T^n$ for each of the distortion techniques T. For each sample in a minibatch, multiple manipulated samples are generated using different distortion techniques. Further, the system configured to calculate loss considering missingness mask appropriately and update weights using back propagation.

TABLE 1

| | | | | 5<sup>th</sup> Position | | | | | | | | | |
|---|---|---|---|---|---|---|---|---|---|---|---|---|---|
| 0. | 0.43 | 0.78 | 0.97 | 0.97 | 0.78 | 0.43 | 0. | −0.43 | −0.78 | −0.97 | −0.97 | −0.78 | −0.43 | 0 |
| 0 | 0.43 | 0.78 | 0.97 | 0.97 | 0.43 | 0 | −0.43 | −0.78 | −0.97 | −0.97 | −0.78 | −0.43 | 0 | 0 |
| 0 | 0.43 | 0.78 | 0.97 | 0.97 | 0.85 | 0.78 | 0.43 | 0. | −0.43 | −0.78 | −0.97 | −0.97 | −0.78 | −0.43 |

Referring Table 1, wherein the reconstruction of original data from deleted and inserted timestamps is elaborated. In the table 1, the first row denotes the original univariate time series data, 2nd and 3rd rows represent the data having deletion and insertion operations, respectively. The system is configured to first select the index randomly to be deleted or inserted. In the case of deletion, the system deletes the values of the time series corresponding to the index selected and shift the remaining data so that there is no gap. Further, the system is configured to add padding towards the end or in the starting of the time-series data to maintain the length of the data same before and after the deletion operation.

It would be appreciated that the deletion of an instance from data is different from the replacement. Similarly, in the case of insertion, the system inserts random values at randomly selected index positions. Herein, the system deletes the data from last or starting to maintain the length of the data after insertion operation same as before the insertion operation. It is to be noted that the length of the padding in case of deletion is same as the number of deleted instances. Similarly, in case of insertion the length of the cropped portion of time series data is same as number of newly inserted instances. This insertion and deletion operation can be at multiple positions of a time series data. Also, the structure of these deletion and insertion operations can be of different type e.g. random or intermittent. In case of multivariate time series data, the system performs insertion and deletion operations on each of the sensor data independently.

In one example, wherein to explain concepts of deletion, insertion, quantization and shuffling respectively, a flame detector voltage of industrial gas turbine combustor is used in accordance with some embodiments of the present disclosure. During the startup of the gas turbine, the flame detector voltage of combustor follows a specific trend. In the starting it is zero and then follow an approximately linear increase till a predefined threshold. Whenever there is some problem in the startup of the gas turbine, it's gets reflected in the abnormal trend of the combustor flame voltage as shown in FIG. 7. One of the use case is to develop machine learning models to identify these abnormal trends. Since, manual generation of these abnormal patterns by introducing faults in the physical gas turbine is a major economic and implementation challenge. Herein, the self-supervised learning helps in generating more data during training of machine learning models and acts as data augmentation. FIG. 3 through FIG. 6 shows graphical representation to illustrate the novel concepts of deletion, insertion, quantization, and shuffling, respectively.

Figure 3:
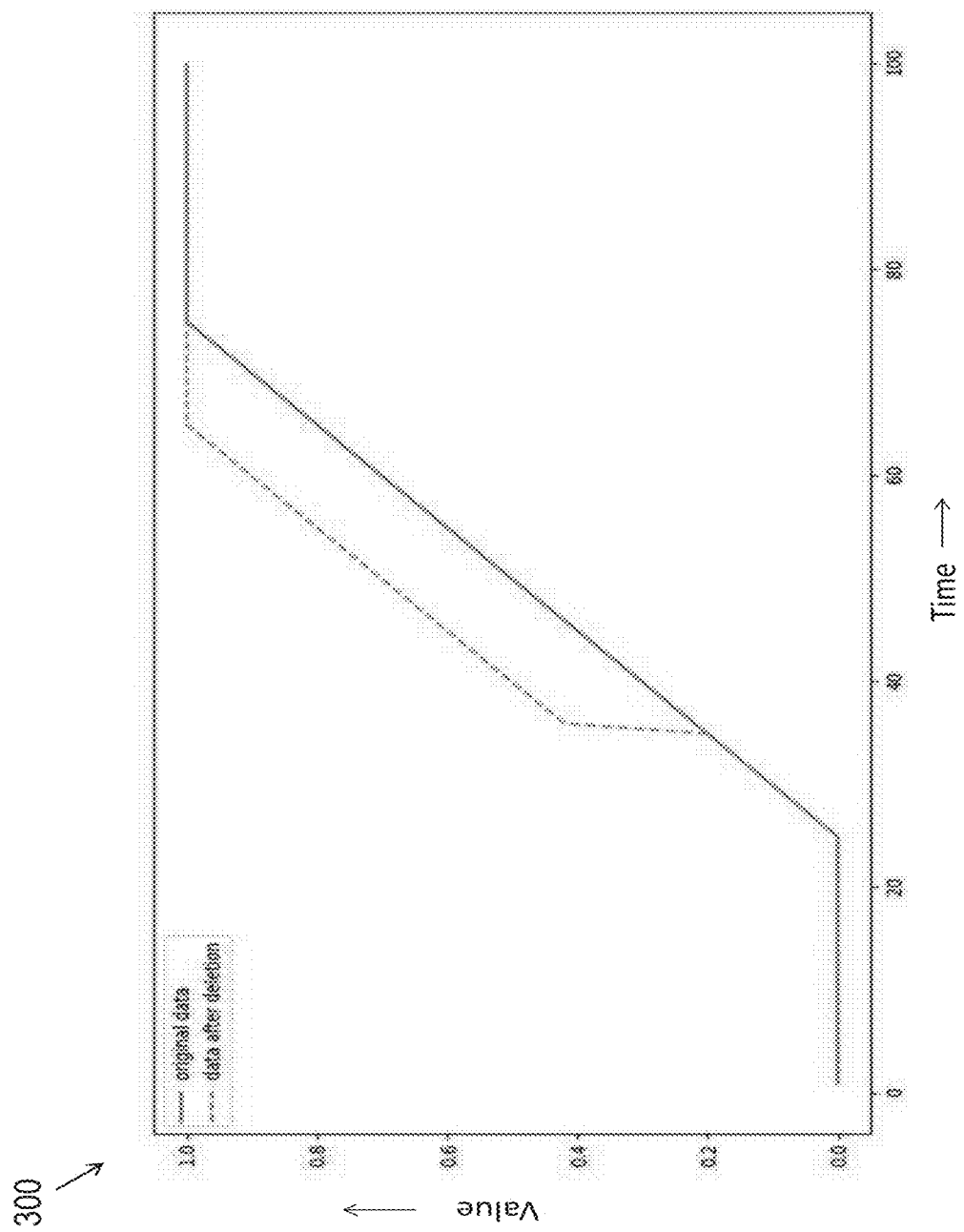
FIG. 3 is a graphical illustration showing working of deletion-based distortion technique in a self-supervised learning, according to an embodiment of the present disclosure.

Referring FIG. 3, a graphical representation (300) to illustrate original and modified time-series data of flame detector voltage of gas turbine combustor corresponding to a normal operation. The time-series data is normalized between 0 and 1. FIG. 3 illustrates the working of the deletion-based distortion technique in a self-supervised learning algorithm. Instances corresponding to the timesteps 36-45 is deleted and the corresponding modified data is represented by dotted line. Since, its necessary to keep the length of the data same before and after deletion-based data manipulation, the system has inserted padding towards the end of the data. The length of the padding is same as the length of the deleted part. Last value of the end data point has been taken as the value of each element in the padding.

Figure 4:
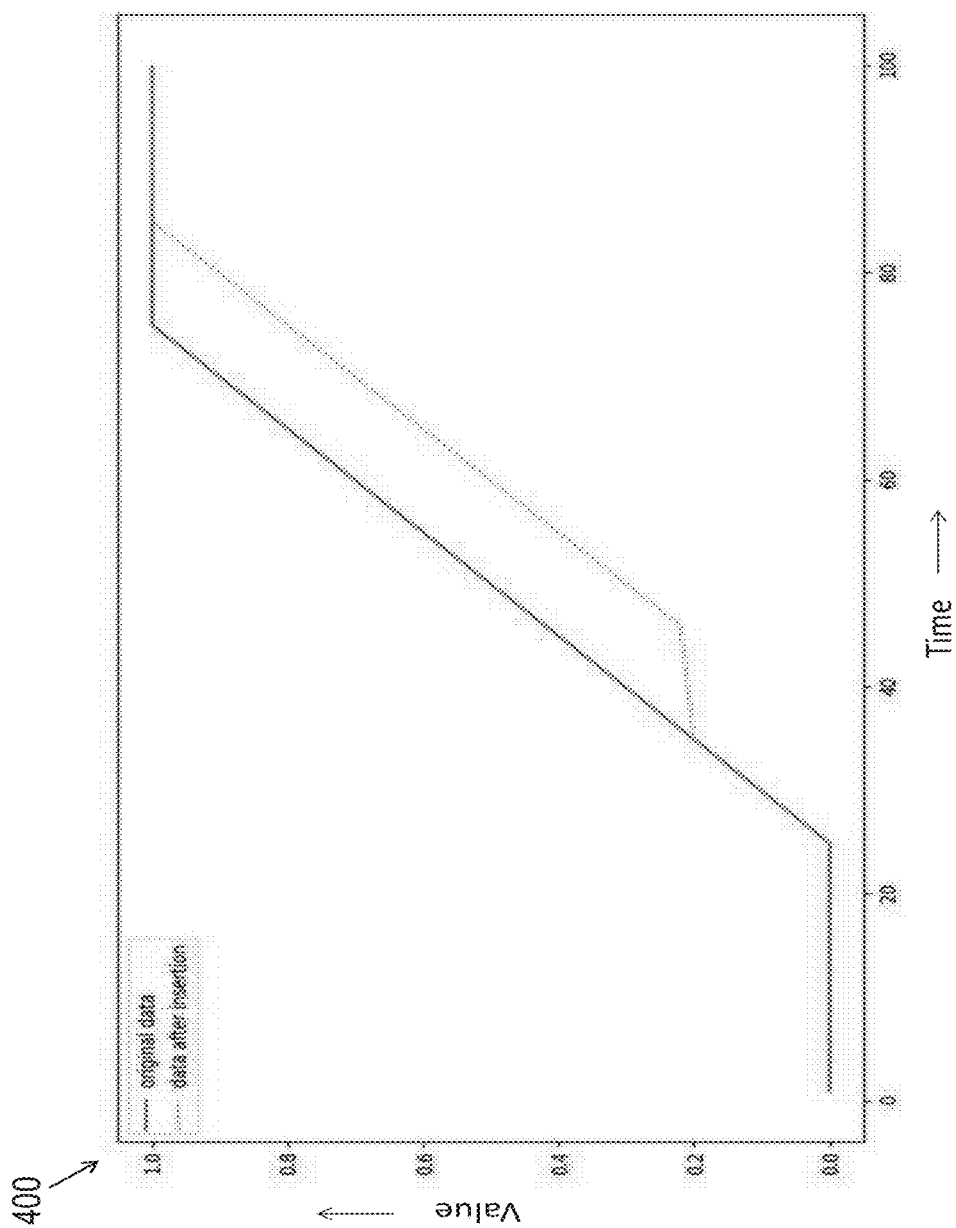
FIG. 4 is a graphical representation to illustrate working of insertion-based distortion technique in a self-supervised learning, according to an embodiment of the present disclosure.

In another embodiment, referring FIG. 4, a graphical representation (400) represents the original and modified data of flame detector voltage of gas turbine combustor corresponding to normal operation. The data is normalized between 0 and 1. The graph depicts the working of the insertion-based distortion technique in a self-supervised learning algorithm. Herein, 10 new instances are inserted at index 36-45 and corresponding modified data is represented by a dotted line. The values corresponding to these instances is interpolated such that difference between successive inserted values remains same. Since, it is necessary to keep the length of the data same before and after insertion-based data manipulation, the system has deleted 10 instances of the data towards the end. The number of deleted instances is same as the length of the inserted part.

In another embodiment, wherein to reconstruct the original data using quantized signal, the system is configured to generate quantized data $x_q \in R^{AXN}$ A<M, be the subset of un-labeled data taken randomly from X. the quantized data $x_q$ can be generated using:

$$x_q = \left(\text{Round}\left(\frac{x}{q_t}\right)\right) * q_t$$

wherein, quantization step $q_t$ is determined using minimum and maximum of each sensor such that it does not cause too much distortion in the data of each sensor. The quantization step, $q_t$ can be different for different sensors. Furthermore, the system is configured to reconstruct original masked data using randomly shuffled subsequences.

Figure 5:
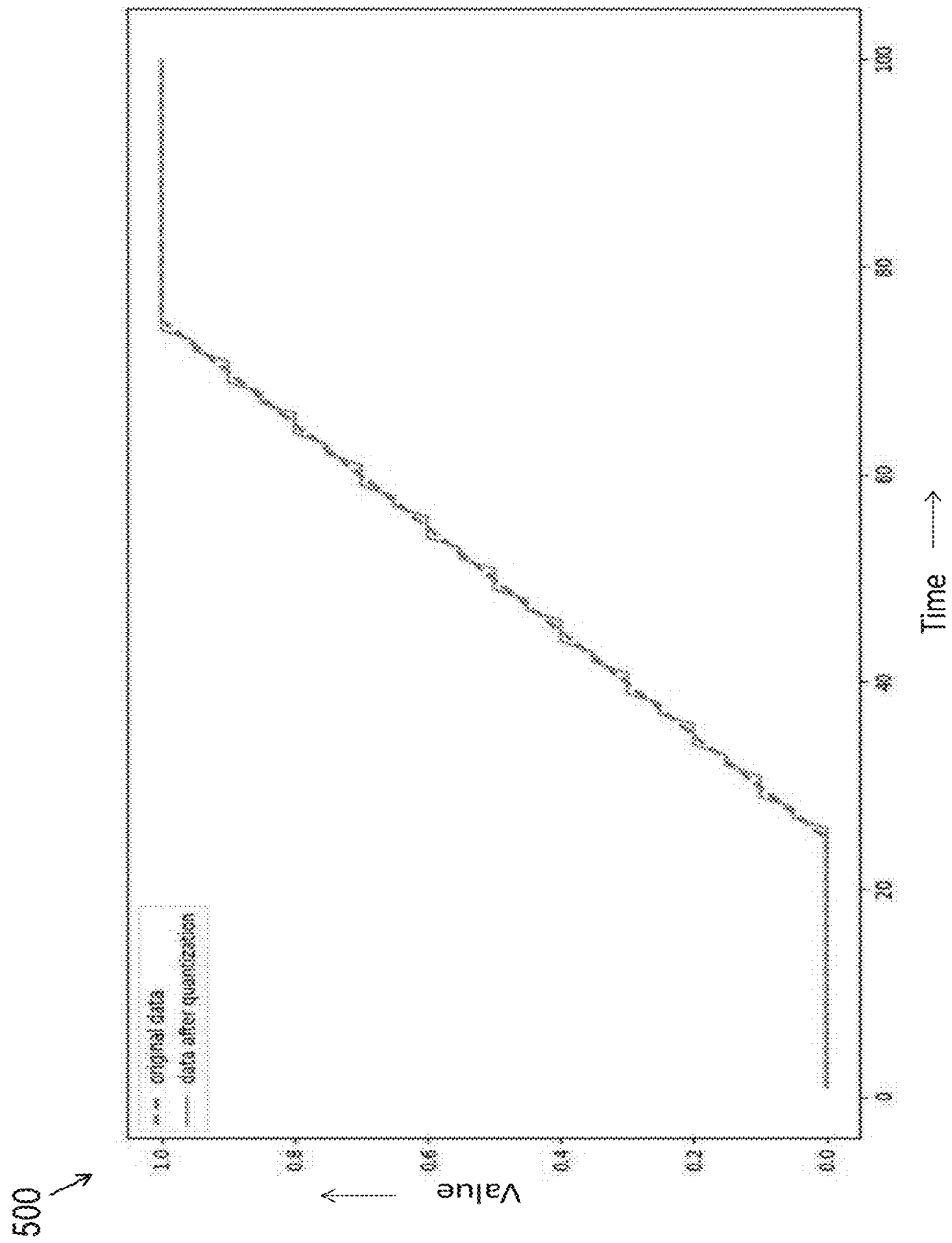
FIG. 5 is a graphical representation to illustrate working of quantization-based distortion technique in a self-supervised learning, in accordance with some embodiments of the present disclosure.

Referring FIG. 5, a graphical representation (500) to showcase original and modified data of flame detector voltage of gas turbine combustor corresponding to a normal operation. The data is normalized between 0 and 1. It illustrates the working of the quantization-based distortion technique in a self-supervised learning algorithm. In the example shown in FIG. 3 the system has taken 0.05 as quantization step. Herein, the quantized data is represented by a dotted line.

Figure 6:
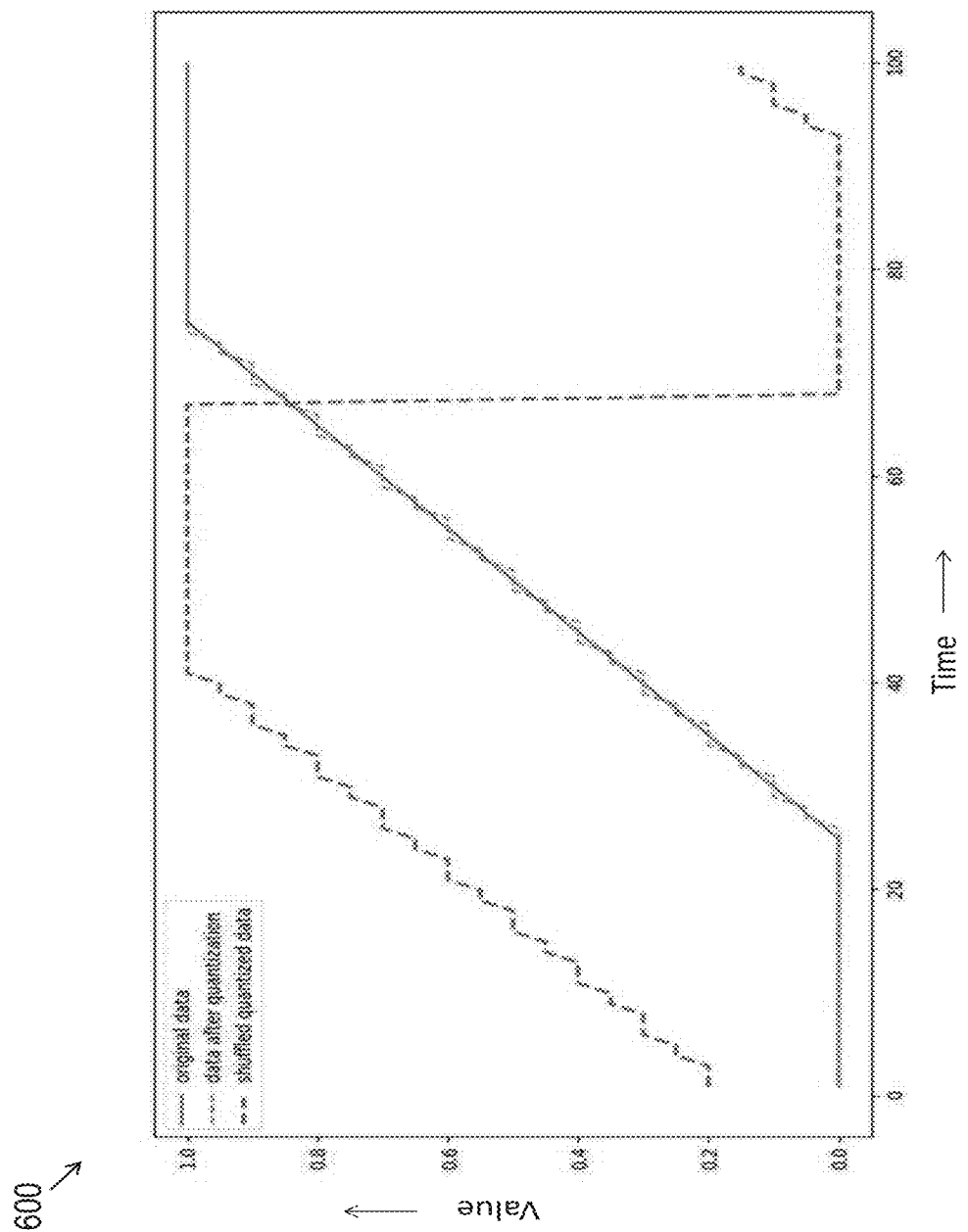
FIG. 6 is a graphical representation to illustrate working of shuffling-based data distortion technique in a self-supervised learning, in accordance with some embodiments of the present disclosure.
Figure 7:
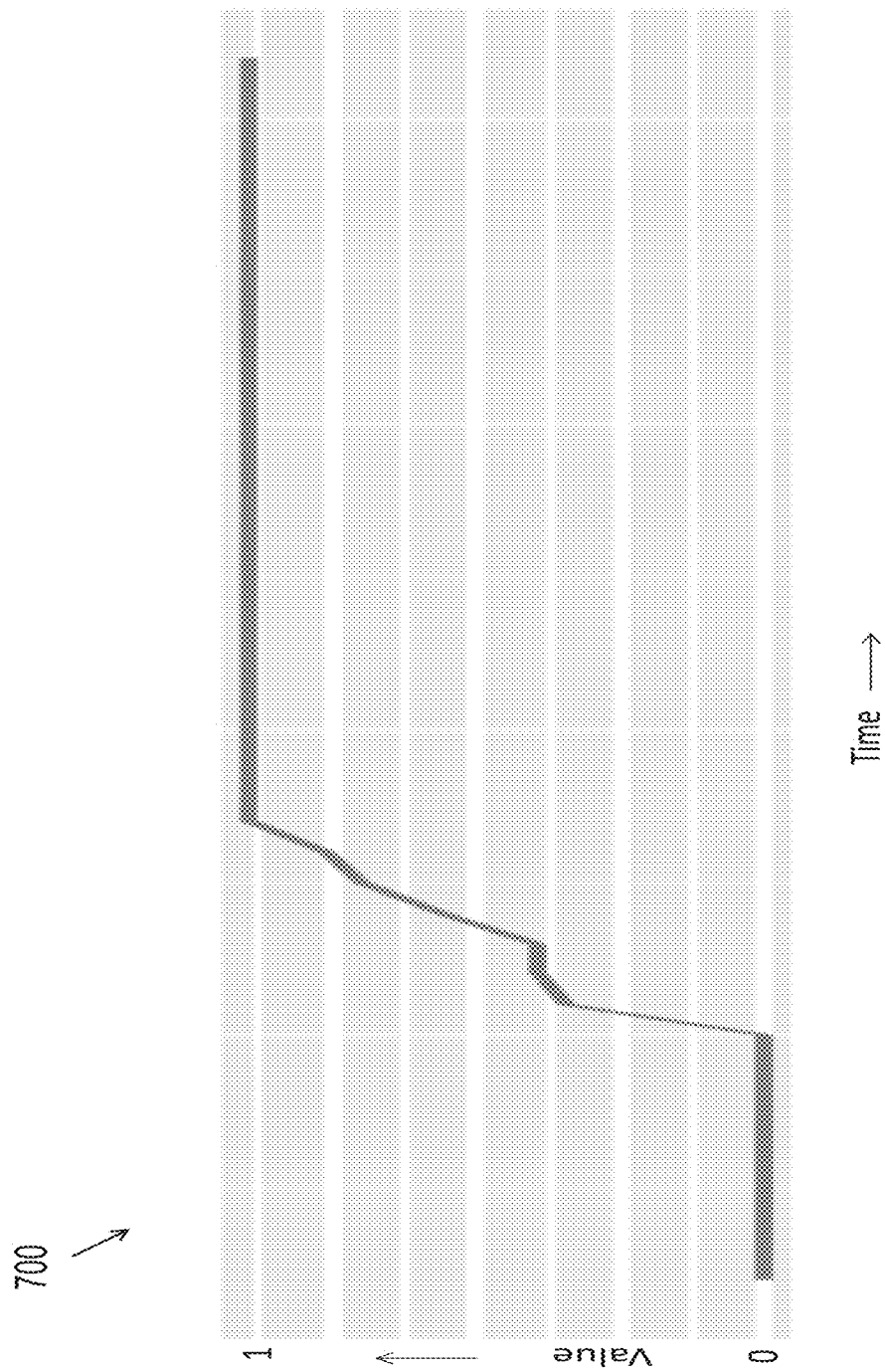
FIG. 7 is a graphical representation to illustrate the data of flame detector voltage of gas turbine combustor corresponding to abnormal operation, in accordance with some embodiments of the present disclosure.

Referring FIG. 6, a graphical representation (600) represents the original, quantized, and shuffled data of flame detector voltage of gas turbine combustor corresponding to normal operation. The data is normalized between 0 and 1. FIG. 6 illustrates the working of a shuffling based data distortion techniques in a self-supervised learning algorithm. It would be appreciated that firstly the data is quantized using a quantization algorithm. Afterwards, the quantized data is divided into 3 equal subsequences and the subsequences are shuffled in random order.

In the preferred embodiment, the training module (120) of the system (100) is configured to train the deep learning based model with the distorted plurality of input data using the self-supervised learning to reconstruct the masked plurality of input of data. After training the model using self-supervised learning, model is finetuned either by replacing final layers of the deep learning based model or training the weights of the final layer of the deep learning based model.

Referring FIG. 7, a graphical representation (700) to represent data of the flame detector voltage of gas turbine combustor corresponding to abnormal operation. The abnormal behavior identification is very critical to the smooth functioning of the industries such as gas fired power plant consisting of several gas turbines. The data is normalized between 0 and 1. The main difference in pattern of abnormal and normal data of flame voltage detector of gas turbine combustor is difference in the trend line representing the transition of voltage from minimum to maximum.

Figure 8:
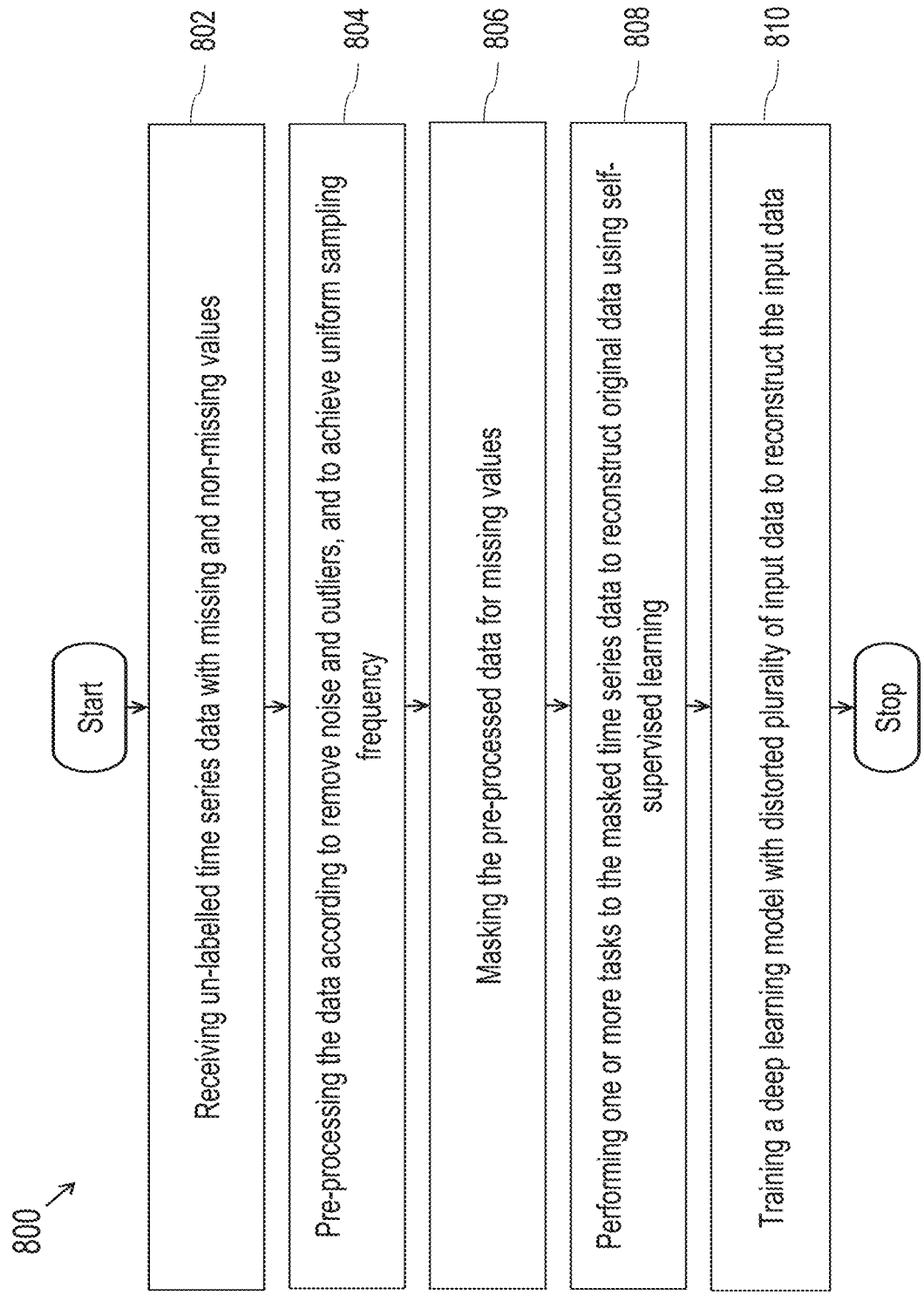
FIG. 8 illustrates a flowchart of a processor-implemented method for self-supervised training of time-series deep learning based models based on self-supervised learning, in according to an embodiment of the present disclosure.

Referring FIG. 8, to illustrate a processor-implemented method (800) for training a deep learning based model with an un-labelled time-series data.

Initially, at the step (802), a plurality of input data from one or more predefined data sources, wherein the plurality of input un-labelled time-series data, wherein the time-series data includes univariate and multi-variate datasets.

In the preferred embodiment, at the next step (804), the received plurality of data is pre-processed for verification of availability of received plurality of data, removal of redundant data, unification of sampling frequency, filtering of data, identification and removal of outliers, and synchronization by incorporating appropriate lags and integration of a plurality of variables from one or more databases. It is to be noted that the plurality of models includes one or more data-driven models, one or more physics-based models and one or more hybrid models.

In the preferred embodiment, at the next step (806), masking the preprocessed plurality of input data for one or more missing values of the input data.

In the preferred embodiment, at the next step (808), distorting the masked plurality of input data using one or more distortion techniques. The one or more distortion techniques include quantization, insertion, deletion, and combination of the one or more distortion techniques with random subsequence shuffling.

In the preferred embodiment, at the last step (810), training the deep learning based model with the distorted plurality of input data using the self-supervised learning to reconstruct the masked plurality of input of data.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of getting large amount of labelled data for training the deep learning based model because the labelled data is either very limited in industries or very expensive to acquire because labelling or annotation of unlabeled data require lot of expertise and manual labor. Therefore, embodiments herein provide a system and method for training a deep learning based model with a un-labelled time-series data.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

What is claimed is:

1. A processor-implemented method for self-supervised training of a deep learning based model with un-labelled time-series data comprising:

receiving, via one or more hardware processors, a plurality of input data from one or more predefined data sources, wherein the plurality of input data is the un-labelled time-series data;

preprocessing, via the one or more hardware processors, the received plurality of input data for verification of availability of the received plurality of input data to:
remove noise and outliers;
achieve uniform sampling frequency of the received plurality of input data; and
synchronization by incorporating lags and integration of a plurality of variables from one or more databases;

masking, via the one or more hardware processors, the preprocessed plurality of input data for one or more missing values of the plurality of input data and applying missingness mask corresponding to the one or more missing values, wherein the method handles missing data without need of imputation as the method uses the missingness mask;

distorting, via the one or more hardware processors, the masked plurality of input data of a flame detector voltage of an industrial gas turbine combustor using one or more distortion techniques, wherein the one or more distortion techniques include quantization determined using minimum and maximum of each sensor data and the quantization is different for different sensors, insertion, deletion, and combination of the one or more such distortion techniques with random subsequence shuffling, wherein calculating loss considering the missingness mask appropriately and update weights using back propagation, wherein, in case of the deletion, add padding towards an end or in starting of the input data to maintain a length of the input data same before and after the deletion, and the length of the padding in case of the deletion is same as number of deleted instances, wherein, in case of the insertion, deleting the input data from last or starting to maintain length of the input data after the insertion same as before the insertion, and the length of a cropped portion of the input data is same as number of newly inserted instances; and training, via the one or more hardware processors, the deep learning based model with the distorted plurality of input data using self-supervised learning to reconstruct the masked plurality of input data, wherein, after training the deep learning based model using self-supervised learning, the deep learning based model is finetuned either by replacing final layers of the deep learning based model or training the weights of the final layer of the deep learning based model, wherein the trained deep learning based model is used to identify abnormal trends of the flame detector voltage of the industrial gas turbine combustor.

2. The processor-implemented method of claim 1, wherein the time-series data includes univariate and multivariate datasets, and wherein in case of the multivariate datasets, performing the insertion and the deletion operations on each of the sensor data independently.

3. The processor-implemented method of claim 1, wherein the quantization technique includes discretization of the time series signal.

4. The processor-implemented method of claim 1, wherein the insertion technique comprises of inserting one or more values between selected pairs of instances in the time series data.

5. The processor-implemented method of claim 1, wherein the deletion technique comprises of deletion of one or more randomly selected instances in the time series data.

6. A system for self-supervised training of a deep learning based model with un-labelled time-series data comprising:
an input/output interface for receiving a plurality of input data from one or more predefined data sources, wherein the plurality of input data is un-labelled time-series data, wherein the time-series data includes univariate and multi-variate datasets;
one or more hardware processors;
a memory in communication with the one or more hardware processors, wherein the one or more hardware processors are configured to execute programmed instructions stored in the memory, to:
preprocess the received plurality of input data for verification of availability of the received plurality of input data to remove noise and one or more outliers from the received plurality of input data, achieve uniform sampling frequency of the time-series data, and synchronizing by incorporating lags and integration of a plurality of variables from one or more databases;
mask the preprocessed plurality of input data for one or more missing values of the input data and applying missingness mask corresponding to the one or more missing values, wherein the system is configured to handle missing data without need of imputation as the system uses the missingness mask;
distort the masked plurality of input data using one or more distortion techniques of a flame detector voltage of an industrial gas turbine combustor, wherein the one or more distortion techniques include quantization determined using minimum and maximum of each sensor data and the quantization is different for different sensors, insertion, deletion, and combination of the one or more distortion techniques with random subsequence shuffling, wherein the system is configured to calculate loss considering the missingness mask appropriately and update weights using back propagation, wherein, in case of the deletion, the system is configured to add padding towards an end or in starting of the input data to maintain a length of the input data same before and after the deletion, and the length of the padding in case of the deletion is same as number of deleted instances, wherein, in case of the insertion, the system deletes the input data from last or starting to maintain length of the input data after the insertion same as before the insertion, and the length of a cropped portion of the input data is same as number of newly inserted instance; and
train the deep learning based model with the distorted plurality of input data using the self-supervised learning to reconstruct the masked plurality of input data, wherein, after training the deep learning based model using self-supervised learning, the deep learning based model is finetuned either by replacing final layers of the deep learning based model or training the weights of the final layer of the deep learning based model, wherein the trained deep learning based model is used to identify abnormal trends of the flame detector voltage of the industrial gas turbine combustor.

7. A non-transitory computer readable medium storing one or more instructions which when executed by one or more processors on a system, cause the one or more processors to perform method for self-supervised training of a deep learning based model with un-labelled time-series data comprising:
receiving, via one or more hardware processors, a plurality of input data from one or more predefined data sources, wherein the plurality of input data is un-labelled time-series data;
preprocessing, via the one or more hardware processors, for verification of availability of the received plurality of input data the received plurality of input data to:
remove noise and outliers from the received plurality of input data;
achieve uniform sampling frequency of the received plurality of input data; and
synchronization by incorporating lags and integration of a plurality of variables from one or more databases;
masking, via the one or more hardware processors, the preprocessed plurality of input data for one or more missing values of the input data and applying missingness mask corresponding to the one or more missing values, wherein the method handles missing data without need of imputation as the method uses the missingness mask;
distorting, via the one or more hardware processors, the masked plurality of input data of a flame detector voltage of an industrial gas turbine combustor using one or more distortion techniques, wherein the one or more distortion techniques include quantization determined using minimum and maximum of each sensor data and the quantization is different for different sensors, insertion, deletion, and combination of the one or more distortion techniques with random subsequence shuffling, wherein calculating loss considering the missingness mask appropriately and update weights using back propagation, wherein, in case of the deletion, add padding towards an end or in starting of the input data to maintain a length of the input data same before and after the deletion, and the length of the padding in case of the deletion is same as number of deleted instances, wherein, in case of the insertion, deleting the input data from last or starting to maintain length of the input data after the insertion same as before the insertion, and the length of a cropped portion of the input data is same as number of newly inserted instances; and
training, via the one or more hardware processors, the deep learning based model with the distorted plurality of input data using the self-supervised learning to reconstruct the masked plurality of input of data, wherein, after training the deep learning based model using self-supervised learning, the deep learning based model is finetuned either by replacing final layers of the deep learning based model or training the weights of the final layer of the deep learning based model, wherein the trained deep learning based model is used to identify abnormal trends of the flame detector voltage of the industrial gas turbine combustor.

* * * * *